US008407673B2

(12) United States Patent
Terpolilli (10) Patent No.: US 8,407,673 B2
(45) Date of Patent: Mar. 26, 2013

(54) TRACE LOG RULE PARSING

(75) Inventor: Massimo Terpolilli, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1276 days.

(21) Appl. No.: 11/945,550

(22) Filed: Nov. 27, 2007

(65) Prior Publication Data

US 2009/0138861 A1 May 28, 2009

(51) Int. Cl.
*G06F 9/44* (2006.01)
*G06F 11/00* (2006.01)

(52) U.S. Cl. ........ 717/127; 717/126; 717/128; 717/131; 714/741

(58) Field of Classification Search .................. None
See application file for complete search history.

(56) References Cited

U.S. PATENT DOCUMENTS

| | | | | |
|---|---|---|---|---|
| 5,121,475 | A * | 6/1992 | Child et al. ................ | 715/201 |
| 5,644,692 | A * | 7/1997 | Eick ........................... | 715/833 |
| 5,673,390 | A * | 9/1997 | Mueller ..................... | 714/57 |
| 6,564,171 | B1 * | 5/2003 | Peterson et al. ............ | 702/182 |
| 7,086,034 | B2 * | 8/2006 | Mihara ....................... | 717/124 |
| 7,110,936 | B2 * | 9/2006 | Hiew et al. ................. | 703/22 |
| 7,210,071 | B2 * | 4/2007 | Deacon et al. .............. | 714/45 |
| 7,213,176 | B2 * | 5/2007 | Banko ....................... | 714/38.12 |
| 7,266,726 | B1 * | 9/2007 | Ladd et al. ................. | 714/27 |
| 7,363,618 | B2 * | 4/2008 | Pal et al. .................... | 717/131 |
| 7,389,340 | B2 * | 6/2008 | Kasvand et al. ............ | 709/224 |
| 7,552,147 | B2 * | 6/2009 | Josten et al. ............... | 1/1 |
| 7,562,351 | B2 * | 7/2009 | Haas et al. ................. | 717/127 |
| 7,774,760 | B2 * | 8/2010 | Mishra et al. .............. | 717/128 |
| 7,975,262 | B2 * | 7/2011 | Cozmei ..................... | 717/128 |
| 8,001,534 | B2 * | 8/2011 | Daniel et al. ............... | 717/128 |
| 8,291,387 | B2 * | 10/2012 | Pal et al. .................... | 717/126 |
| 2002/0073400 | A1 * | 6/2002 | Beuten et al. .............. | 717/127 |
| 2003/0056155 | A1 * | 3/2003 | Austen et al. .............. | 714/45 |
| 2005/0050224 | A1 * | 3/2005 | Palmer et al. .............. | 709/238 |
| 2005/0066310 | A1 * | 3/2005 | Creamer et al. ........... | 717/127 |
| 2005/0144526 | A1 * | 6/2005 | Banko ........................ | 714/38 |
| 2005/0229154 | A1 * | 10/2005 | Hiew et al. ................. | 717/110 |
| 2006/0020866 | A1 * | 1/2006 | Lo et al. .................... | 714/741 |
| 2006/0111888 | A1 * | 5/2006 | Hiew et al. ................. | 703/22 |

OTHER PUBLICATIONS

Björn Wiberg, "Porting AODV-UU Implementation to ns-2 and Enabling Trace-based Simulation", [Online], 2002, pp. 1-95, [Retrieved from internet on Nov. 16, 2012] <http://citeseerx.ist.psu.edu/viewdoc/download?doi=10.1.1.115.6380&rep=rep1&type=pdf>.*

(Continued)

*Primary Examiner* — Thuy Dao
*Assistant Examiner* — Ziaul A Chowdhury
(74) *Attorney, Agent, or Firm* — Yudell Isidore Ng Russell PLLC (57) ABSTRACT

A method, system and computer program product for handling errors in trace logs is presented. In an exemplary manner, the method includes detecting, in an error log, an error line entry for an error that is associated with a software execution. The error line entry includes a variable component and a static component. The variable component is associated with a real-time description of the software execution that changes every time the software execution occurs, and the static component is a fixed error descriptor of the error. The fixed error descriptor is parsed out from the error line entry to create a parsed static component, which is correlated with a resource that can be used to correct the error.

9 Claims, 5 Drawing Sheets

OTHER PUBLICATIONS

Kivanc Dincer et al. "Using Java and JavaScript in the Virtual Programming Laboratory: A Web-Based Parallel Programming Environment", [Online], 1997, pp. 1:13, [Retrieved from Internet on Nov. 16, 2012], <http://citeseerx.ist.psu.edu/viewdoc/download?doi=10.1.1.49.1397&rep=repl&type=pdf>.*

Sangeeta Lal et al., "A Static Technique for Fault Localization Using Character N-Gram Based Information Retrieval Model", [Online], 2012, pp. 109-118, [Retrieved from Internet on Nov. 16, 2012], <http://www.iiitd.edu.in/~ashish/ISEC-2012.pdf>.*

Bob Abrams, "zOS RAS Guidelines and Debug Guide for Ported Software", [Online], IBM 1999, pp. 1-34, [Retrieved from Internet on Nov. 16, 2012], <https://www-03.ibm.com/systems/resources/servers_eserver_zseries_zos_unix_pdf_docs_ras.pdf>.*

* cited by examiner

TRACE LOG RULE PARSING

BACKGROUND OF THE INVENTION

The present disclosure relates to the field of computers, and specifically to software. Still more specifically, the present disclosure relates to managing error logs.

An error log provides a trace of errors that occur when software is executed.

BRIEF SUMMARY OF THE INVENTION

A method, system and computer program product for handling errors in trace logs is presented. In an exemplary manner, the method includes detecting, in an error log, an error line entry for an error that is associated with a software execution. The error line entry includes a variable component and a static component. The variable component is associated with a real-time description of the software execution that changes every time the software execution occurs, and the static component is a fixed error descriptor of the error. The fixed error descriptor is parsed out from the error line entry to create a parsed static component, which is correlated with a resource that can be used to correct the error.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java® (Java is a trademark or registered trademark of Sun Microsystems, Inc. in the United States and other countries), Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
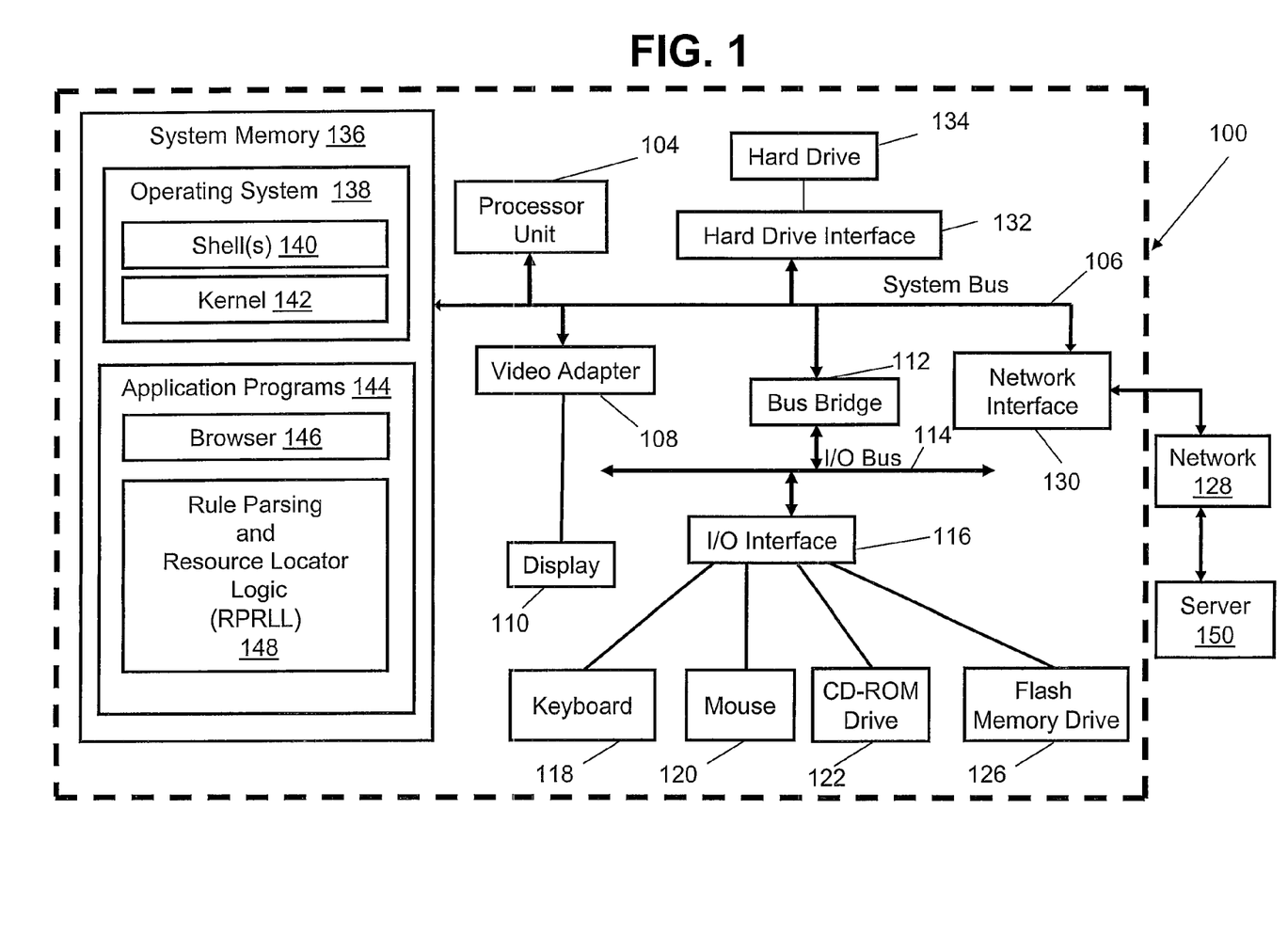
FIG. 1 depicts an exemplary physical computer in which the present invention may be implemented.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Rule Parsing and Resource Locator Logic (RPRLL) 148, which executes the steps described below in FIGS. 2-4.

In one embodiment, computer 100 is able to download RPRLL 148 from service provider server 150, preferably in an "on demand" basis. Furthermore, service provider server 150 is able to execute the code found in RPRLL 148, thus conserving the processing resources of computer 100.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Figure 2:
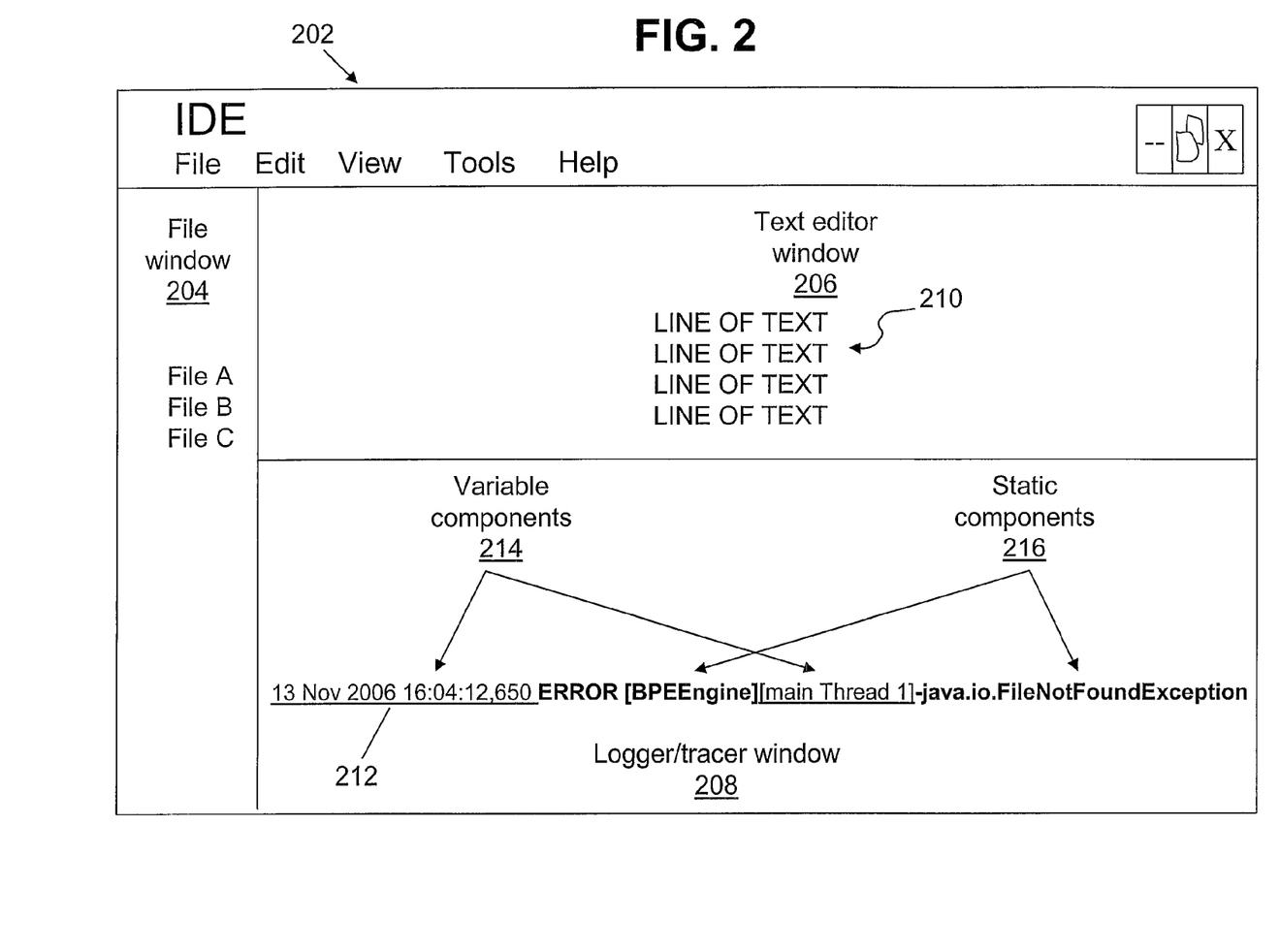
FIG. 2 illustrates a Graphical User Interface (GUI) of an exemplary Integrated Development Environment (IDE) that may be utilized by the present invention.

Referring now to FIG. 2, a GUI 202 for an Integrated Development Environment (IDE) is presented. Note that the IDE includes a file window 204, a text editor window 206, and a logger/tracer window 208. When software file 210 is executed (e.g., compiled, linked, run, etc.), any errors that occur during the software execution will be shown in the logger/tracer window 208. An exemplary error is logged in error line entry 212. Error line entry includes a variable component 214 and a static component 216. The variable component 214 is associated with a real-time description that changes every time the software file 210 executes. The variable component 214 may include a time stamp (shown as "13 Nov. 2006 16:04:12,650") of exactly when the error occurred, as well as the name of the file (shown as "main Thread 1") on which the error occurred. Other data shown in the variable component 214 may include, but is not limited to, a name of a core on which the execution occurred, a name of an owner or manager of the software being executed, Internet Protocol (IP) addresses at which the file is running, a counter showing how many times the error has occurred during a single or multiple executions of the file, etc.

The static component 216 is a fixed error descriptor of the error. As shown in the example, the error was in the Business Process Execution (BPE) Engine (thus showing a description of what software environmental component the error occurred). The error may also be described in more detail (e.g., "java.io.FileNotFoundException"—indicating that the error was an exception that occurred when an input/output file in Java® was not found in memory).

Figure 3:
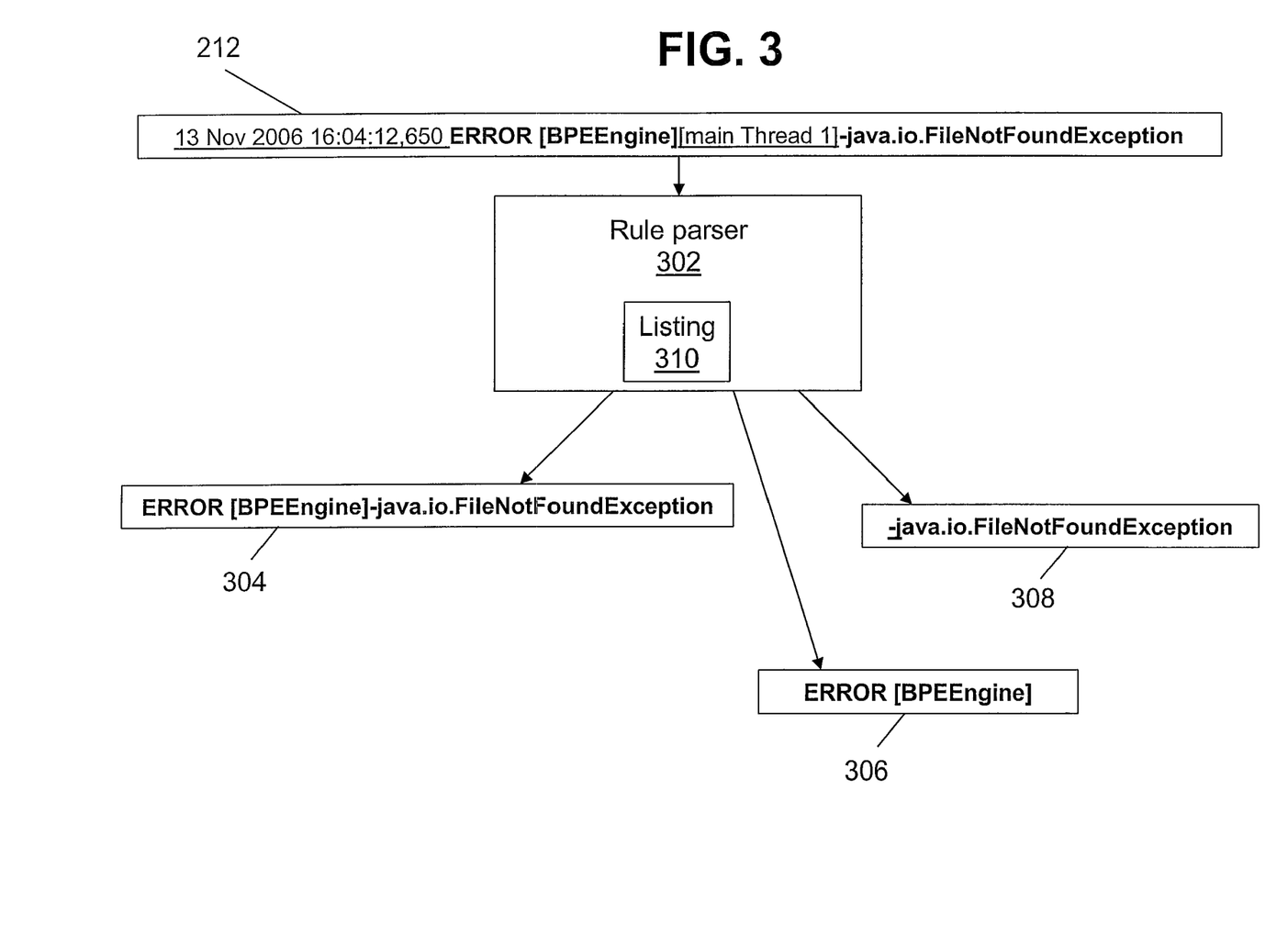
FIG. 3 depicts a rule parser that parses out static components of an error line entry.

With reference now to FIG. 3, a rule parser 302, which may be part of RPRLL 148 shown in FIG. 1, is able to parse out the static component 216 from error line entry 212. As depicted, the rule parser 302 may parse out all of the static component 216 (shown as static component 304) or the rule parser 302 may parse out only subcomponents of the static component 216, as shown as static subcomponents 306 and 308. The rule parser 302 includes a listing 310 of known error language (e.g., "ERROR [BPEEngine]-java.io.FileNotFoundException", "-java.io.FileNotFoundException", "ERROR [BPEEngine]"). When such a string of characters is matched exactly, then the match is confirmed as an error message.

Figure 4:
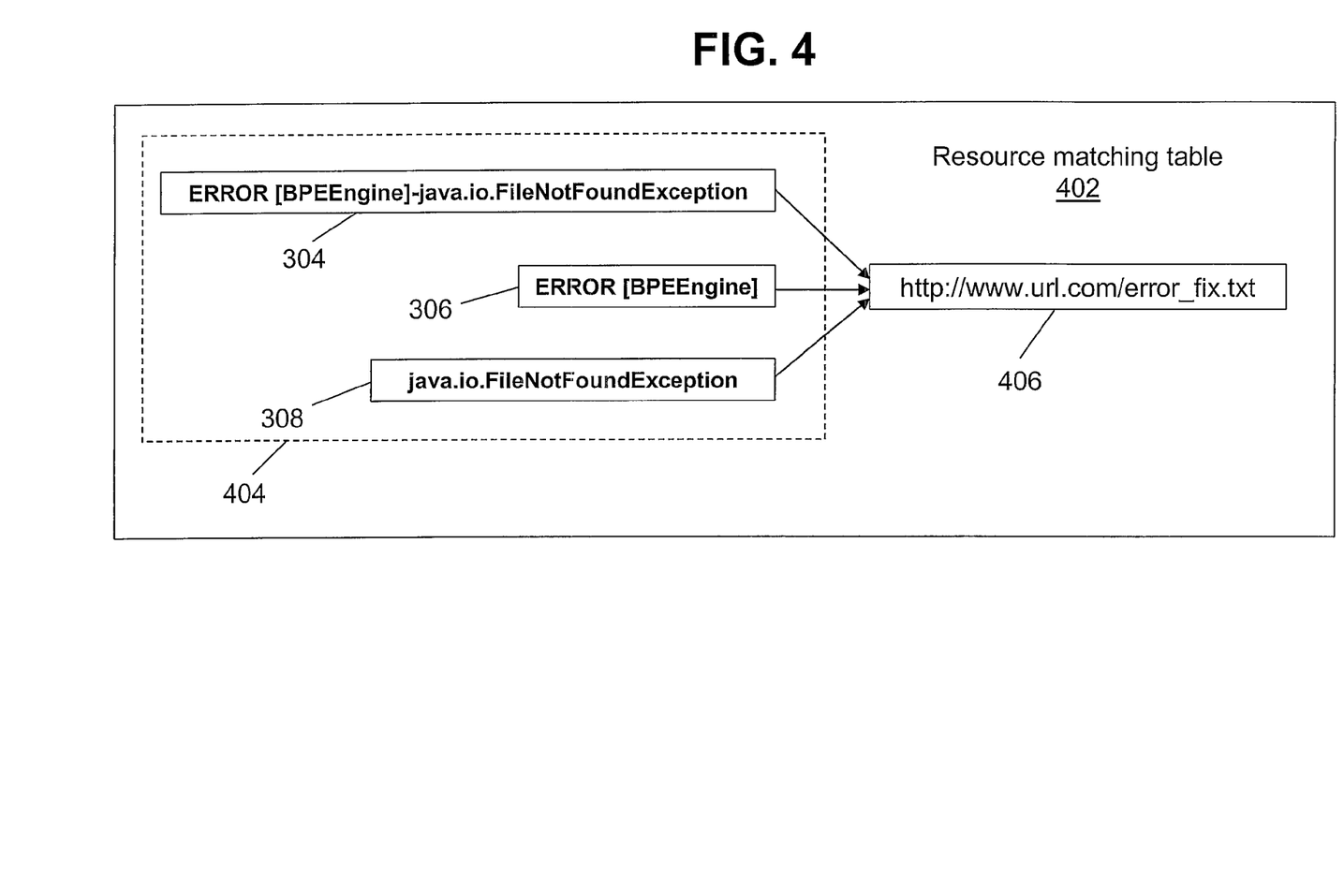
FIG. 4 illustrates static components and subcomponents, from the parsed error line entry, and a correlating resource matched together in a resource matching table.

With reference now to FIG. 4, once the static component or subcomponent is parsed out of the error line entry 212, a resource matching table 402, which may also be part of RPRLL 148 shown in FIG. 1, is able to match entries from table 404 (containing the static component 304 and/or static subcomponents 306 and/or 308) to a resource 406. Resource 406 is a resource that can be used to correct the error described in error line entry 212. As depicted, this may be a Uniform Resource Locator (URL) to a webpage containing instructions, either human-readable or machine executable, that can be used by a user or computer to correct the error.

Other examples of resource 406 include, but are not limited to, phone numbers to a service center having technicians who can solve the problem either remotely or by making an on-site service call; titles of publications that can be used to solve the error; names of programmer(s) who wrote the code that caused the identified type of error, etc. The resource 406 can then be transmitted to a user or machine to solve the error/problem.

Figure 5:
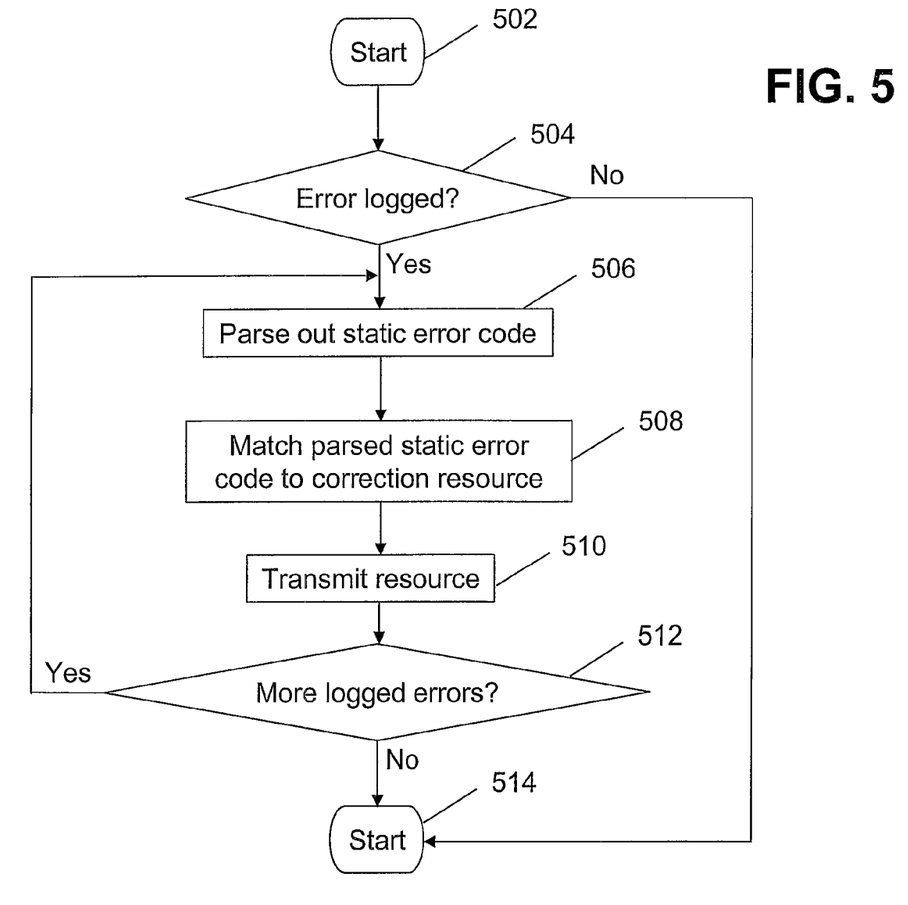
FIG. 5 is a high-level flow-chart of exemplary steps taken by the present invention to parse and utilize static components of a trace to locate a correction resource.

With reference now to FIG. 5, a high-level flow chart of exemplary steps that may be taken in accordance with the present invention to parse static components out of an error line entry is depicted. After initiator block 502, a query is made to determine if an error has been logged in an error log as an error line entry after execution of software has been completed (query block 504). If not, then the process ends at terminator block 514. However, if an error has been detected and logged, then a rule parser parses out only the static component of the error line entry (block 506). This static component may be identified by the rule parser by comparing stored strings of error messages with the entire error line entry. Whenever a string is identified as matching, then that string is parsed out of the error line entry, such that only the error code is shown. This error code is then correlated with a resource that can be used to correct the error (block 508). The resource, either human-readable text or machine-executable code, is then transmitted to a user/machine (block 510). A query is made to determine if there are any more error line entries (query block 512). If so, then the process continues in an iterative manner back up to block 506. Otherwise, the process terminates at terminator block 514.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of handling errors in trace logs, the method comprising: detecting, in an error log, an error line entry for an error that is associated with a software execution,
   wherein the error line entry comprises a variable component and a static component, wherein the variable component is associated with a real-time description of the software execution that changes every time the software execution occurs, and wherein the static component is a fixed error descriptor of the error, the variable component further comprises a time stamp and a name of a file being executed when the error occurred, and wherein the static component comprises a component description of an environmental component in which the error occurred and an error description that describes the error; and
   the variable component has multiple variable subcomponents and the static component has multiple static subcomponents, and wherein the multiple variable subcomponents and the multiple static subcomponents are intermeshed, and the multiple variable subcomponents are noncontiguous in the error line entry;
   parsing out, by a computer processor, a fixed error descriptor of the static subcomponents from the error line entry to create parsed static subcomponents;
   identifying a type of error corresponding to the error from the parsed static subcomponents;
   correlating, in a resource matching table, at least one of the parsed static subcomponents with a resource that can be used to correct the type of error, wherein the resource comprises computer-executable instructions; and
   transmitting the resource to a user for use in correcting the error.

2. The method of claim 1, wherein the multiple variable components are noncontiguous in the error line entry, and wherein the multiple static components are noncontiguous in the error line entry.

3. The method of claim 1, further comprising:
   correlating each of the separate static subcomponents with the resource.

4. A system comprising:
   a processor;
   a data bus coupled to the processor;
   a memory coupled to the data bus; and
   a computer-usable medium embodying computer program code, the computer program code comprising instructions executable by the processor and configured for handling errors in trace logs by causing the system to:
   detect, in an error log, an error line entry for an error that is associated with a software execution, wherein the error line entry comprises a variable component and a static component, wherein the variable component is associated with a real-time description of the software execution that changes every time the software execution occurs, and wherein the static component is a fixed error descriptor of the error, the variable component further comprises a time stamp and a name of a file being executed when the error occurred, and wherein the static component comprises a component description of an environmental component in which the error occurred and an error description that describes the error; and the variable component has multiple variable subcomponents and the static component has multiple static subcomponents, and wherein the multiple variable subcomponents and the multiple static subcomponents are intermeshed, and the multiple variable subcomponents are noncontiguous in the error line entry;

parsing out, by a computer processor, a fixed error descriptor of the static subcomponents from the error line entry to create parsed static subcomponents;

identify a type of error corresponding to the error from the parsed static subcomponents;

correlate, in a resource matching table, at least one of the parsed static subcomponents with a resource that can be used to correct the type of error, wherein the resource comprises computer-executable instructions; and transmit the resource to a user for use in correcting the error.

5. The system of claim 4, wherein the multiple variable components are noncontiguous in the error line entry, and wherein the multiple static components are noncontiguous in the error line entry.

6. The system of claim 4, the computer code further causing the processor to:

correlate each of the separate static subcomponents with the resource.

7. A computer program product for handling errors in trace logs, the computer program product comprising:

a tangible computer usable storage memory having stored therein computer usable program code, the computer usable program code comprising:

computer usable program code configured for detecting, in an error log, an error line entry for an error that is associated with a software execution, wherein the error line entry comprises a variable component and a static component, wherein the variable component is associated with a real-time description of the software execution that changes every time the software execution occurs, and wherein the static component is a fixed error descriptor of the error, the variable component further comprises a time stamp and a name of a file being executed when the error occurred, and wherein the static component comprises a component description of an environmental component in which the error occurred and an error description that describes the error; and the variable component has multiple variable subcomponents and the static component has multiple static subcomponents, and wherein the multiple variable subcomponents and the multiple static subcomponents are intermeshed, and the multiple variable subcomponents are noncontiguous in the error line entry;

computer usable program code configured for parsing out a fixed error descriptor of the static subcomponents from the error line entry to create parsed static subcomponents;

computer usable program code configured for identifying a type of error corresponding to the error from the parsed static subcomponents;

computer usable program code configured for correlating, in a resource matching table, at least one of the parsed static subcomponents with a resource that can be used to correct the type of error, wherein the resource comprises computer-executable instructions; and computer usable program code configured for transmitting the resource to a user for use in correcting the error.

8. The computer program product of claim 7, wherein the multiple static components are noncontiguous in the error line entry.

9. The computer program product of claim 7, wherein the computer usable program code further comprises:

computer usable program code configured for correlating each of the separate static subcomponents with the resource.

* * * * *